(12) United States Patent
Shen et al.

(10) Patent No.: US 7,603,034 B2
(45) Date of Patent: Oct. 13, 2009

(54) OPTICAL IDENTIFICATION DEMODULATION METHOD AND SYSTEM

(75) Inventors: Shuqiang Shen, Shenzhen (CN); Congqi Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 488 days.

(21) Appl. No.: 11/537,964

(22) Filed: Oct. 2, 2006

(65) Prior Publication Data
US 2008/0080862 A1 Apr. 3, 2008

(51) Int. Cl.
*H04B 10/08* (2006.01)
*H04B 10/06* (2006.01)

(52) U.S. Cl. .............................. 398/25; 398/33; 398/35; 398/208

(58) Field of Classification Search ................ 398/25, 398/31, 33, 140, 66, 58, 35, 47, 75, 98, 202, 398/208, 214
See application file for complete search history.

(56) References Cited

U.S. PATENT DOCUMENTS

| | | | |
|---|---|---|---|
| 7,035,544 B1 * | 4/2006 | Won | 398/79 |
| 7,054,556 B2 * | 5/2006 | Wan et al. | 398/32 |
| 7,158,723 B2 * | 1/2007 | Wan et al. | 398/32 |
| 2003/0067651 A1 | 4/2003 | Wan et al. | |
| 2004/0062548 A1 * | 4/2004 | Obeda et al. | 398/25 |

FOREIGN PATENT DOCUMENTS

| | | |
|---|---|---|
| CN | 1166076 C | 12/2001 |
| CN | 1155842 C | 11/2002 |
| WO | WO 2005020458 A1 | 3/2005 |

OTHER PUBLICATIONS

Huawei Technologies Co., Ltd.; PCT International Search Report; PCT Application No. PCT/CN2006/002594; International Filing Date: Sep. 30, 2006; Mailing Date: Jul. 12, 2007; 5 pgs.
Huawei Technologies Co., Ltd.; PCT Written Opinion of the International Searching Authority; PCT Application No. PCT/CN2006/002594; International Filing Date: Sep. 30, 2006; Mailing Date: Jul. 12, 2007; 6 pgs.

* cited by examiner

*Primary Examiner*—M. R. Sedighian
(74) *Attorney, Agent, or Firm*—Conley Rose, P.C.; Grant Rodolph (57) ABSTRACT

A telecommunications network component comprising: a processor configured to implement a method comprising: receiving an optical signal comprising at least one identification signal, the identification signal comprising a series of frequency portions that alternate in turn according to a frequency interval defined for each of the series of frequency portions, partitioning the identification signal by way of a plurality of windows, performing a Fast Fourier Transform (FFT) on each of the plurality of windows, determining which of the plurality of windows comprise a relative minimum number of frequency components, and detecting an optical channel based on results of the FFT performed on each of the plurality of windows that comprise the relative minimum number of frequency components.

20 Claims, 7 Drawing Sheets

OPTICAL IDENTIFICATION DEMODULATION METHOD AND SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed generally to optical communication networks, and specifically to an improved optical identification method for optical communication networks.

BACKGROUND

An optical communication network employing wavelength division multiplexing (WDM) can simultaneously transmit a plurality of optical signals or optical channels at different wavelengths. Each optical channel may be modulated by the data (text, voice, video, etc.) being transmitted. Furthermore, for identification of each channel, an identification signal may also be modulated onto the channel. When a channel is to be subsequently identified, a portion of the mixed modulated optical signal may be retrieved and the identification signal demodulated.

The identification signal used to modulate the optical signal comprises a time-division multi-frequency signal, wherein transitions between successive frequencies may induce an unwanted signal disturbance that makes demodulation of the identification signal difficult. Attempts to solve the disturbance problem caused by such frequency switching remain unsatisfactory. For example, some proposals have been costly by calling for unnecessary additional hardware, or they have caused degradation of the optical signal itself. Therefore, a need exists for an improved method for optical identification demodulation in an optical communications network.

SUMMARY

In one aspect, embodiments of the invention comprise a telecommunications network component comprising: a processor configured to implement a method comprising: receiving an optical signal comprising at least one identification signal, the identification signal comprising a series of frequency portions that alternate in turn according to a frequency interval defined for each of the series of frequency portions, partitioning the identification signal by way of a plurality of windows, performing a Fast Fourier Transform (FFT) on each of the plurality of windows, determining which of the plurality of windows comprise a relative minimum number of frequency components, and detecting an optical channel based on results of the FFT performed on each of the plurality of windows that comprise the relative minimum number of frequency components.

In another aspect, embodiments of the invention comprise a method comprising: receiving an optical identification signal that detects an optical channel (the optical identification signal comprises a first frequency portion having a first frequency interval and a second frequency portion having a second frequency interval, wherein the first frequency portion and the second frequency portion alternate in sequence based on the first frequency interval and the second frequency interval, and wherein a plurality of frequency switching points are located where the optical identification signal changes between the first frequency portion and the second frequency portion), partitioning the optical identification signal using a plurality of windows each having a time window, performing a Fast Fourier Transform (FFT) on each of the plurality of windows (the plurality of windows comprise a set of windows having a relative minimum number of frequency components), and using results of the FFT performed on the set of windows having the relative minimum number of frequency components for detection of the optical channel.

In yet another aspect, embodiments of the invention comprise a system comprising: an optical tap that extracts a portion of a modulated light source comprising an optical identification signal (the optical identification signal comprises a series of frequency portions that alternate in turn according to a frequency interval defined for each frequency portion, and the optical identification signal identifies an optical channel), a modulus converter electrically coupled to the optical tap that partitions the optical identification signal by way of a plurality of windows, a Fast Fourier Transform (FFT) unit electrically coupled to the modulus converter that performs an FFT on each of the plurality of windows, and a control unit electrically coupled to the FFT unit (the control unit determines which of the plurality of windows comprise a relative minimum number of frequency components, and the control unit identifies the optical channel based on results of the FFT performed on each of the plurality of windows that comprise the relative minimum number of frequency components).

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Described herein is an improved method for identification of optical channels in an optical communications network by way of an optical identification signal demodulation scheme that avoids the frequency switching effect. Rather than demodulating by performing a Fast Fourier Transform (FFT) on a portion of the optical identification signal containing a frequency switching point defined by the boundary of two signals of distinct frequencies, the present demodulation method partitions the optical identification signal into a plurality of windows, some of which do not contain a frequency switching point. By selecting the windows not containing a frequency switching point and by using FFT results from those windows for demodulation, it is possible to avoid the effect of frequency switching for the identification of optical channels. Thus, the optical identification demodulation method may further be described as a method for selecting a time window for each of the plurality of windows and as a method for determining which of the plurality of windows do not contain a frequency switching point.

As previously discussed, optical wavelength division multiplexing (WDM) networks can simultaneously transmit data (text, voice, video, etc.) by way of a plurality of optical signals or optical channels. For channel identification purposes, the optical channels may be modulated by an identification signal comprising, for example, a time-division multi-frequency (TDMF) signal. Optical channels may subsequently be identified at the optical layer by way of extracting a portion of the optical signal and retrieving the identification signal. Demodulation of the identification signal may comprise a sequence of steps such as photoelectric transformation, filtering, and performing an FFT.

Figure 1:
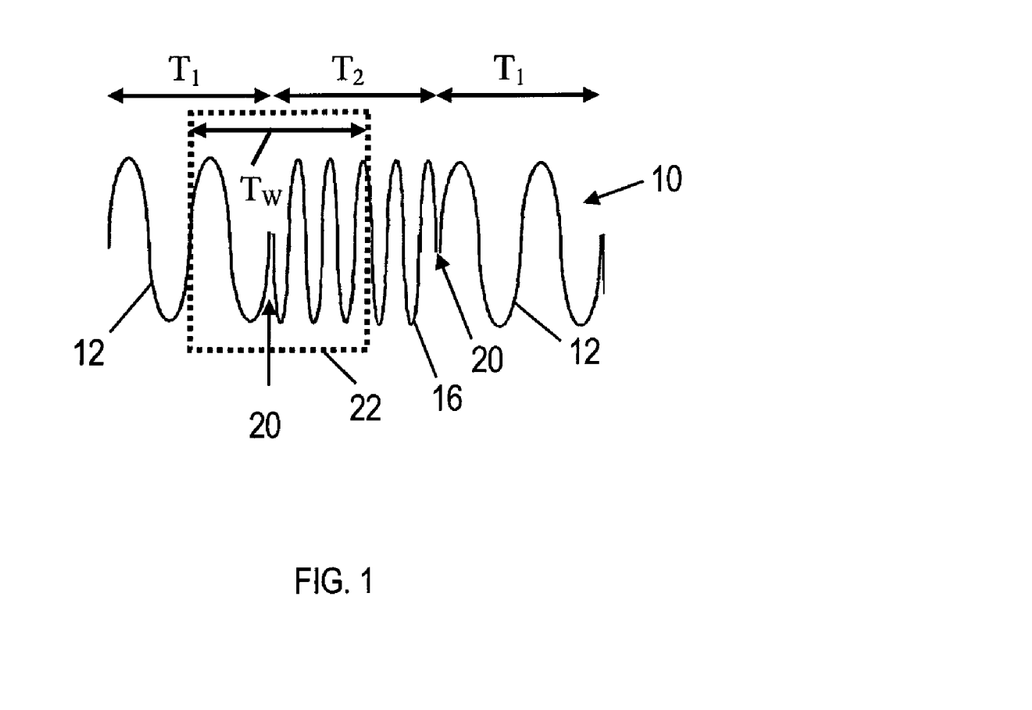
FIG. 1 is an example of an optical identification signal in accordance with embodiments of the invention.

FIG. 1 illustrates an exemplary identification signal 10 used for modulation of an optical channel. As shown, the identification signal 10 comprises a first frequency portion 12 and a second frequency portion 16, wherein the first and second frequency portions alternate in sequence. In some embodiments, the identification signal 10 may comprise more than two (2) signals with distinct frequencies. The first frequency portion 12 and the second frequency portion 16 may be provided, for example, by a plurality of programmable frequency sources such as direct digital synthesizers (DDS), wherein the signals may then be alternatively modulated onto the optical channel. A frequency switching point 20 is defined as the transition between successive frequency portions (i.e., the transition from the first frequency portion 12 to the second frequency portion 16, or from the second frequency portion 16 to the first frequency portion 12), wherein the number of switching points and the temporal position of each of the switching points may vary based on the duration of the first frequency portion 12 and/or the second frequency portion 16. Accordingly, the duration of the first frequency portion 12 is defined by a first frequency interval $T_1$, and the duration of the second frequency portion 16 is defined by a second frequency interval $T_2$. In some embodiments, the frequency intervals (e.g., $T_1$ and $T_2$) associated with each frequency portion are equal. In other embodiments, the frequency intervals associated with each frequency portion are unequal.

When performing optical channel identification, a portion of the signal is selected for demodulation by way of FFT processing, the result of which may comprise an FFT power spectrum (hereafter called an FFT spectrum) comprising a peak coinciding with the frequency of the identification signal 10. Referencing FIG. 1, the portion of the signal selected for FFT processing is enclosed by a dashed window 22, having a time window (i.e., duration) $T_W$. As shown, the portion of the signal selected for demodulation may have a frequency switching point. The phase shift present at such a switching point will cause disturbance frequencies to be generated upon FFT processing, making optical identification demodulation of the identification signal difficult. Moreover, the FFT spectrum associated with the identification signal 10 will decrease and the signal-to-noise ratio (SNR) will degrade.

Various methods have been used in an attempt to solve the problem of optical identification demodulation results being affected by disturbance frequencies introduced by the phase shifts due to frequency switching. For example, one DDS (instead of a plurality as discussed above) has been used to generate both the first frequency portion 12 and the second frequency portion 16 in an attempt to make the phase at the switching point as continuous as possible. Other methods have mixed the identification signal 10 with a low frequency (e.g., 0.25 Hz) signal such that the frequency switching points occur when the amplitude of the low frequency signal is close to zero. However, this method uses an additional DDS for generation of the low frequency signal. Despite the apparent advantages of these methods, they remain inadequate solutions in that costs are increased by calling for additional hardware components and/or the FFT spectrum of the optical identification signal is degraded due to having two frequencies contained in a single window 22.

In embodiments of the present invention, the problems caused by frequency switching, as well as the problems associated with the various other methods described above, have been addressed by providing methods for the selection of a time window $T_W$ for each of a plurality of windows (e.g., FIG. 1, window 22) that serve to partition the optical identification signal, by providing methods for determining which of the plurality of windows do not contain a frequency switching point, and by providing a cost-effective system which may be used in embodiments of the present invention. Proper selection of the time window $T_W$ of each of the plurality of windows ensures that some of the windows will not comprise a frequency switching point. Thus, an FFT can be performed exclusively on those windows not comprising a switching point, or only the FFT results of the windows not comprising a switching point may be selected to be used as the results of the demodulation of the identification signal 10.

Optical WDM networks using TDMF signals for modulation of optical channels may utilize a variety of TDMF signal implementations such as: single-channel multi-frequency equal time-division; multi-channel multi-frequency equal time-division; single-channel multi-frequency unequal time-division; or multi-channel multi-frequency unequal time-division, among others. The following discussion will explain various embodiments of the present invention with respect to each of these TDMF signal implementations.

Figure 2:
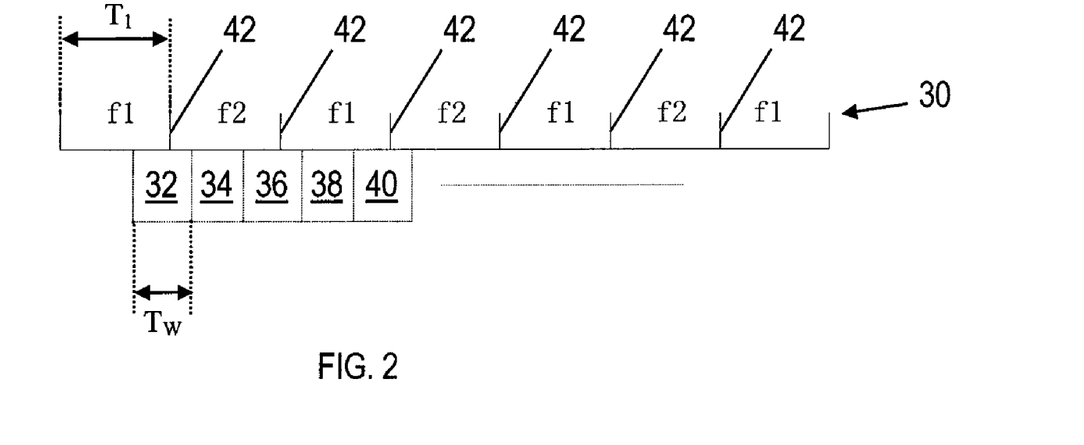
FIG. 2 is a schematic view of a first optical identification signal in accordance with embodiments of the invention.

Beginning with single-channel multi-frequency equal time-division, consider the case of single-channel two-frequency equal time-division, as shown in FIG. 2. In particular, FIG. 2 shows a schematic view of an optical identification signal 30 comprising a first frequency portion (f1) and a second frequency portion (f2) that alternate in sequence, define a plurality of frequency switching points 42, and have equal frequency intervals $T_1$. Also shown are a plurality of windows (32, 34, 36, 38, and 40) that schematically partition the optical identification signal 30, wherein some of the plurality of windows do not coincide with any of the frequency switching points 42. For example, window 34 and window 38 do not coincide with a switching point 42. Furthermore, each of the plurality of windows has an equal duration defined by a time window $T_W$. In alternative embodiments, the windows may each have distinct time windows.

As stated above, proper selection of the time window $T_W$ of each of the plurality of windows will ensure that some of the windows will not comprise a frequency switching point 42. For the present example of two-frequency equal time-division, proper selection of the time window $T_W$ is governed by the following equation:

$$T_W \leq \frac{T_1}{2} \qquad (1)$$

wherein $T_1$ is the frequency interval. Thus, if a plurality of windows each having a time window $T_W$, as defined by Equation 1, are used to sample the optical identification signal 30, then at least one window in each frequency interval $T_1$ will only comprise a single frequency (i.e., without a frequency switching point 42). In some embodiments, a plurality of windows in each frequency interval $T_1$ will only comprise a single frequency.

In one exemplary embodiment, after the time window $T_W$ has been defined and the optical identification signal has been partitioned accordingly, an FFT may be performed on all of the plurality of windows (e.g., windows 32, 34, 36, 38, and 40). Thereafter, only the FFT results of the windows not comprising a switching point 42 (e.g., windows 34 and 38) are selected to be used as the results of the demodulation of the optical identification signal 30. In some embodiments, the windows not comprising a switching point 42 are determined by a method comprising the step of sorting those windows that have "clean" FFT results. For embodiments of the present invention, a clean FFT result comprises an FFT spectrum that exhibits a clear, clean peak at the frequency of the identification signal 30 without sidebands or spurious peaks that would otherwise be present if the window comprised a switching point 42. A clean FFT result may further comprise windows that contain a minimum number of frequency components as compared to other windows. For example, windows having a switching point, and thus having additional noise, will have more frequency components present in their FFT results at frequencies corresponding to the noise. Thus, sorting windows that have clean FFT results may comprise sorting those windows that have a relative minimum number of frequency components in their FFT results. In some embodiments, FFT results that have not been determined to be clean results may be discarded.

In another exemplary embodiment, after the time window $T_W$ has been defined and the optical identification signal 30 has been partitioned accordingly, an FFT need not be performed on all of the plurality of windows. Rather, upon finding the first window that does not have a switching point 42, which is accomplished by correspondingly finding the first clean FFT result, the remainder of windows of the plurality of windows that also do not have a switching point 42 may be determined by mathematic methods. Thus, FFTs performed on those remainder of windows are ensured to have clean FFT results. Referring again to FIG. 2, an FFT would be performed on window 32, and the presence of the switching point 42 would generate an FFT result with sidebands, spurious peaks, or other noise. Thereafter, an FFT would be performed on window 34, and the absence of a switching point 42 would generate a clean FFT result. Thus, window 34 would be the first window to give a clean FFT result, and therefore window 34 would be determined to be the first window without a switching point 42. Once this has been determined, the remainder of windows not having a switching point 42 can be defined as every window having a delay as defined by:

$$\text{delay} = n * T_1 \qquad (2)$$

wherein n comprises the set of positive integers (e.g., 1, 2, 3, . . . ), and wherein the delay is taken with respect to the first window that does not have a switching point 42 (i.e., window 34). From Equation 2 and FIG. 2, it follows that since the second window (i.e., window 34) is the first window that does not have a switching point 42, then the set of all windows not having a switching point 42 will comprise windows 34, 38, and generally every $2n^{th}$ window thereafter. Likewise, if window 32 were instead the first window that did not have a switching point 42, then the set of all windows not having a switching point would comprise windows 32, 36, 40, and generally every $(2n+1)^{th}$ window thereafter. An FFT may then be selectively performed on each of the remainder of windows not having a switching point 42, with the results being used for the demodulation of the optical identification signal 30. In this manner, the disturbance introduced by frequency switching points 42 as well as the problem of degradation of the FFT spectrum caused by one window containing more than one frequency may be avoided.

Figure 3:
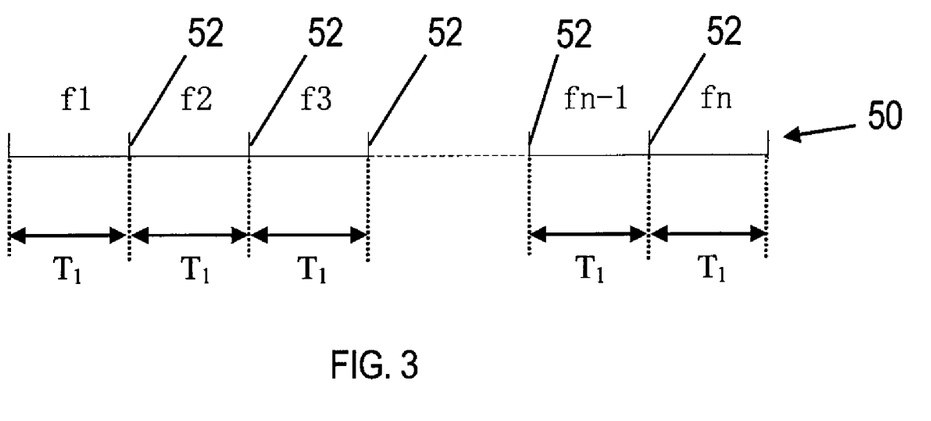
FIG. 3 is a schematic view of a second optical identification signal in accordance with embodiments of the invention.

As an extension to the single-channel two-frequency example described above, consider the example of demodulation of a single-channel multi-frequency (comprising more than 2 frequencies) equal time-division optical identification signal as illustrated in FIG. 3. Specifically, FIG. 3 shows a schematic view of an optical identification signal 50 comprising a first frequency portion (f1), a second frequency portion (f2), a third frequency portion (f3), a $(n-1)^{th}$ frequency portion (fn-1), and an $n^{th}$ frequency portion (fn) in sequence and having equal frequency intervals $T_1$. In particular, the successive changes in frequency portions may follow a defined periodic pattern having defined time intervals. The plurality of windows used to partition the optical identification signal 50 is not shown. However, the selection of the time window $T_W$ of each of the plurality of windows is analogous to the previously described example and defined by Equation 1. Again, an FFT may be performed on all of the plurality of windows, wherein only those windows having clean FFT results are selected to be used as the results of the demodulation of the optical identification signal 50. Alternatively, as in the previous example, once the first window with a clean FFT result is found, an FFT may be selectively performed on each of the remainder of windows not having a switching point 52, wherein this remainder of windows is determined by mathematic methods such as described by Equation 2.

Figure 4:
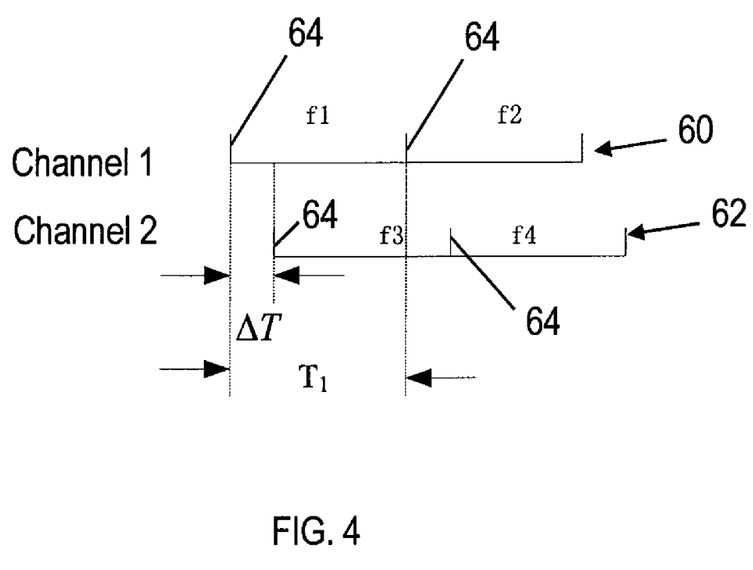
FIG. 4 is a schematic view of two optical identification signals in accordance with embodiments of the invention.

Embodiments of the present invention may also be applied to the simultaneous detection of multiple optical channels. For example, FIG. 4 illustrates a case of two-channel two-frequency equal time-division, specifically showing a schematic view of two optical identification signals 60 and 62 (corresponding to optical channel 1 and optical channel 2, respectively) wherein channel 1 comprises a first frequency portion (f1) and a second frequency portion (f2) and channel 2 comprises a third frequency portion (f3) and a fourth frequency portion (f4), and wherein each of the frequency portions have equal frequency intervals $T_1$. As shown, there exist more frequency switching points 64 within a given interval of time, as compared to the single-channel case, for simultaneous identification of channel 1 and channel 2. The proper selection of the time window $T_W$ for each of a plurality of windows (not shown) that are meant to partition the optical identification signals (60 and 62) of channel 1 and channel 2 is somewhat different than the previous examples. Specifically, in order to avoid the increased number of frequency switching points 64, the time window $T_W$ of each of the plurality of windows should be the greater of the following two equations:

$$T_W \leq \frac{\Delta T}{2} \qquad (3)$$

$$T_W \leq \frac{(T_1 - \Delta T)}{2} \qquad (4)$$

wherein $\Delta T$ is the offset time between the optical identification signals (60 and 62) of channels 1 and 2. This will ensure that there will be a plurality of windows that do not comprise a switching point 64 and that no identifier frequency (i.e., the frequency of each of the frequency portions f1-f4) is being left out. The greater value of Equations 3 and 4 is preferentially selected in order to obtain the highest FFT spectrum resolution for a given sampling frequency. Additionally, since $\Delta T$ is a variable, the largest selectable window is smallest when $\Delta T = T_1/2$. Thus, in order to ensure there is always a plurality of windows that do not contain a switching point 64 independent of the value of $\Delta T$, the time window $T_W$ of each of the plurality of windows should be:

$$T_W \leq \frac{T_1}{4} \qquad (5)$$

Such a selection of the time window $T_W$ ensures that there is a sequence of windows that do not contain a switching point 64 and that all identifier frequencies are sampled. By generalizing Equation 5, it can be further stated that the largest time window $T_W$ of each of the plurality of windows that should be selected is:

$$T_W \leq \frac{T_1}{2*N} \qquad (6)$$

wherein N is the number of optical channels to be detected simultaneously.

When demodulating the optical identification signals (60 and 62), the FFT results corresponding to each window within a particular frequency interval $T_1$ may be compared to find the cleanest FFT result (i.e., the cleanest FFT spectrum) that may then be used as the identifier frequency within this $T_1$ time for the purpose of optical channel identification. Mathematic methods can also be used, as previously discussed, to simplify the optical identification signal demodulation. For example, 2*N windows (within a particular frequency interval $T_1$) may be continuously examined in order to find a window having the cleanest FFT result. The window having the cleanest FFT spectrum may thus be used as a base, wherein the remaining windows selected are those windows having integer multiple $T_1$ delays with respect to the base window. In this way, all frequency switching points 64 may be avoided. In some exemplary embodiments, the number of channels N at a physical detection point (where demodulation is performed) may be unknown. In such a case, the largest possible number of channels in the system can be used as the value of N. This will ensure that a sequence of windows with no frequency switching points 64 is obtained.

Figure 5:
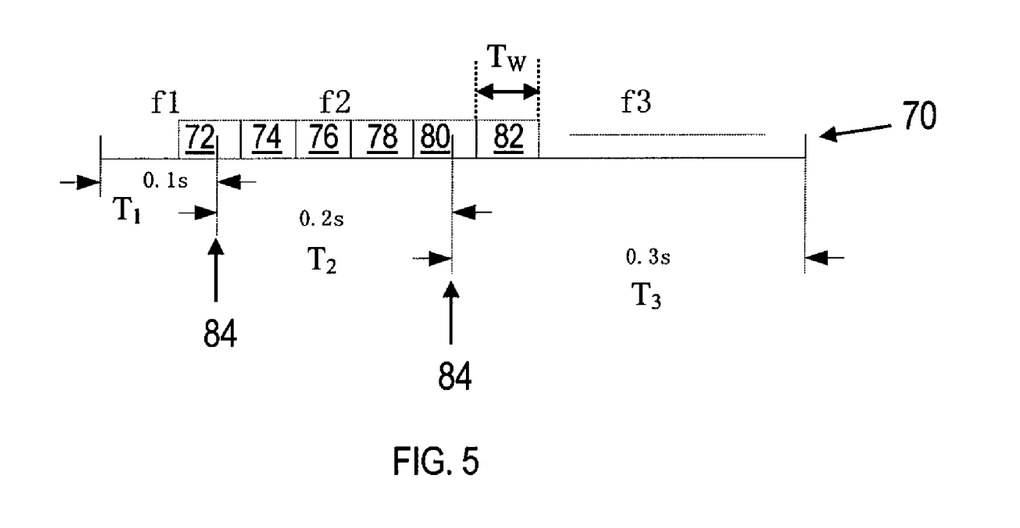
FIG. 5 is a schematic view of a third optical identification signal in accordance with embodiments of the invention.

FIG. 5 illustrates an example of single-channel multi-frequency unequal time-division. Specifically, FIG. 5 shows a schematic view of an optical identification signal 70 comprising a first frequency portion (f1), a second frequency portion (f2), and a third frequency portion (f3) in sequence and having unequal frequency intervals $T_1$, $T_2$, and $T_3$. Also shown are a plurality of windows (72, 74, 76, 78, 80, and 82) that schematically partition the optical identification signal 70, wherein some of the plurality of windows do not coincide with a frequency switching point 84. Specifically, windows 74, 76, 78, and 82 do not coincide with a switching point 84. Additionally, each window of the plurality of windows has an equal duration defined by a time window $T_W$. In this particular example, the proper time window $T_W$ for each of the plurality of windows may be defined as:

$$T_W \leq \frac{T_{MIN}}{2} \qquad (7)$$

wherein $T_{MIN}$ is defined as the smallest of $T_1$, $T_2$, and $T_3$. Such a selection of the time window $T_W$ ensures that there is a sequence of windows comprising a single frequency (i.e., no switching point 84) and that all identifier frequencies (e.g., corresponding to frequency portions f1, f2, and f3) are sampled. When demodulating the optical identification signal 70, the windows with the cleanest FFT results may be used for the purpose of optical channel identification, and the remaining FFT results may be discarded. Alternatively, as described with respect to other embodiments, the demodulation process may be simplified by using mathematic methods to determine the set of windows that do not comprise a frequency switching point 84. For example, referring again to FIG. 5, the frequency interval of individual frequencies ($T_1$, $T_2$, and $T_3$) may be divided by the smallest of the three time lengths. In this example, $T_1 = 0.1$ seconds(s), $T_2 = 0.2$ s, and $T_3 = 0.3$ s. Therefore, dividing the three frequency intervals by 0.1 s results in the sequence of positive integers: 1, 2, 3. Thereafter, the largest common divisor of each number in this sequence of integers is found (1 in this case), divided by two (2), and multiplied by the minimum time unit ($T_1$ in this example). For the case illustrated in FIG. 5: (½)*0.1 s=0.05 s. Thus, once the first window having a clean FFT result is found (i.e., the first window without a frequency switching point 84), it may be used as the base, and the result of the present calculation may be used to find the remaining windows without a frequency switching point 84 by selecting those windows that are temporally positioned at integer multiples of the calculation result (e.g., 0.5 s) with respect to the base window. For the example of FIG. 5, since window 74 is the first window without a switching point 84, it will be the first window selected for optical channel identification demodulation. From the above discussion, window 74 will serve as the base window, and the other windows selected will be window 78 and window 82. Following this pattern, all the windows selected for optical channel identification will comprise a single frequency.

Figure 6:
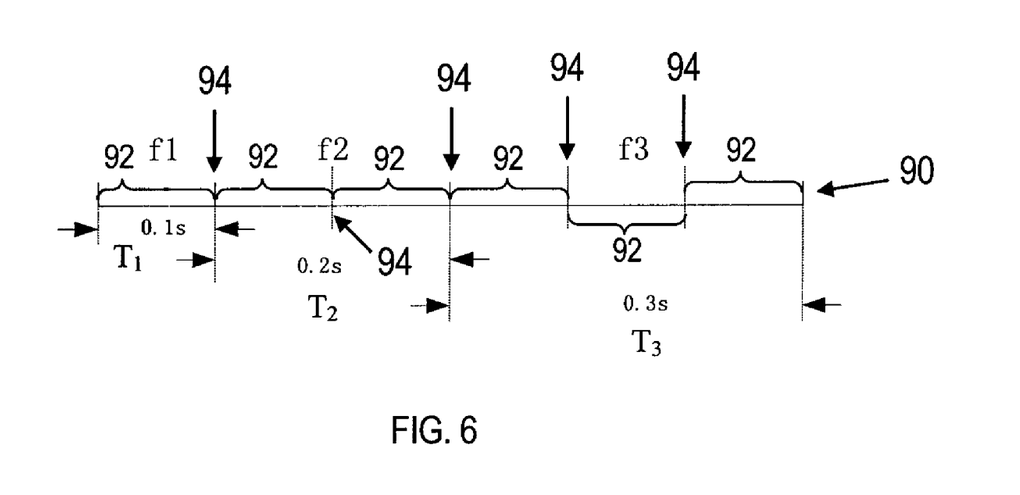
FIG. 6 is a schematic view of a fourth optical identification signal in accordance with embodiments of the invention.

For the case of multi-channel multi-frequency unequal time-division identification, simultaneous detection of multiple channels is similar to that for single-channel multi-frequency equal time-division identification. In this case, all of the plurality of windows for each of the plurality of optical channels should be transformed (by FFT processing) and the transform results of the windows that do not have a clean FFT spectrum should be discarded. Referring to FIG. 6, to further simplify the demodulation process, the largest common divisor of the time lengths ($T_1$, $T_2$, and $T_3$) in an optical identification signal 90 may be used to divide the identifier frequency portions (f1, f2, and f3) into equal time interval portions 92, while treating the boundary of each interval as if it were a true frequency switching point 94. In so doing, it is possible that in some circumstances the frequency following the switching point 94 is the same as the one preceding the switching point 94, but this will not affect the result of the identification demodulation of the plurality of optical channels. After the division of the identifier frequencies (as illustrated in FIG. 6), the time window $T_W$ of each of the plurality of windows may be defined as the largest common divisor multiplied by the smallest time unit (as previously discussed) divided by 2*N (where N is the number of channels), and mathematic methods may be used to select the windows that do not have a switching point 94. This will ensure that a sequence of windows that do not contain a switching point 94 is obtained without losing any identifier frequencies.

Figure 7:
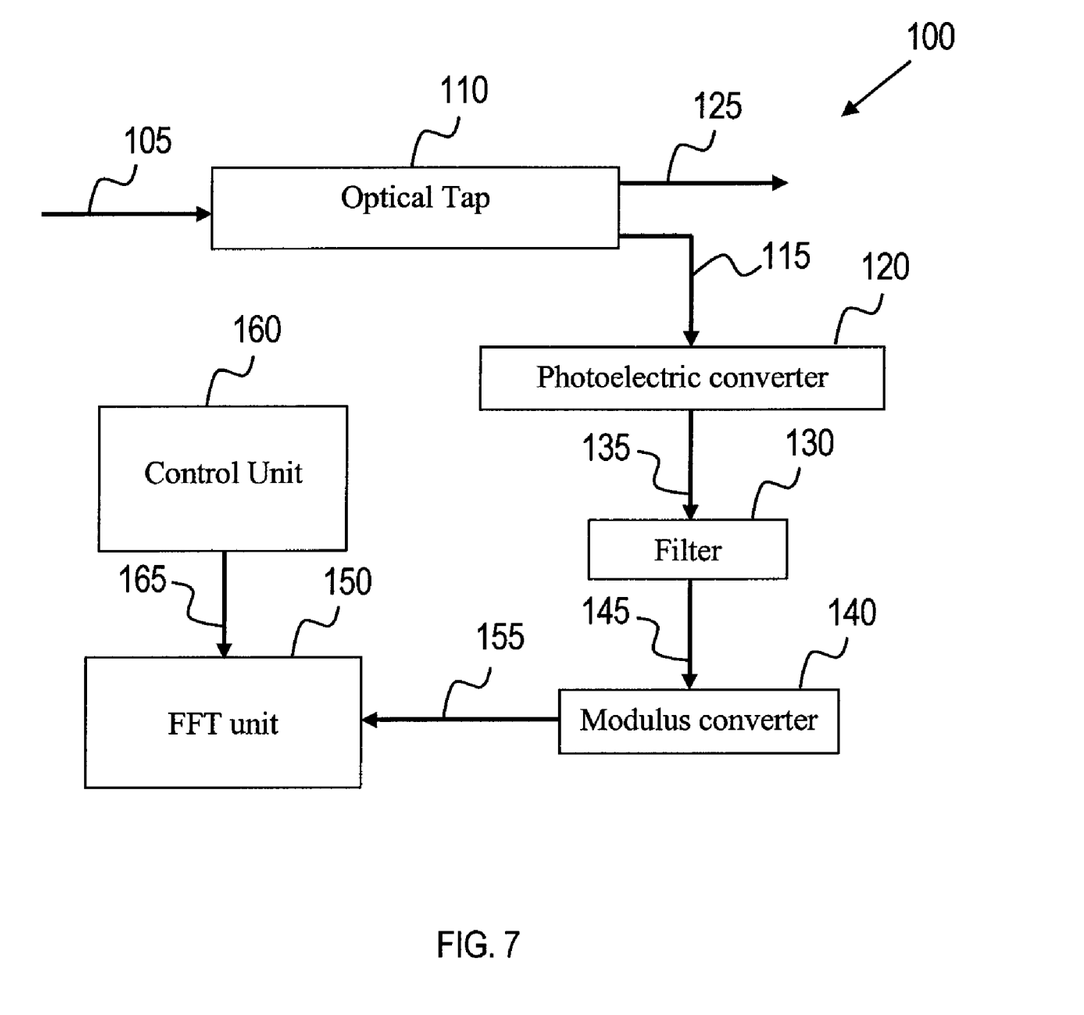
FIG. 7 is an example of a system in accordance with embodiments of the invention.

FIG. 7 illustrates one exemplary embodiment of a system 100 for demodulation of an optical identification signal, which may be used in embodiments of the invention as described herein. Referring to FIG. 7, a modulated light source is provided to an optical tap 110 via an optical path 105. The optical tap 110 functions to extract a small fraction of light that is provided to a photoelectric converter 120 via an optical path 115 while the remainder of the modulated light source passes to an outgoing optical path 125. The photoelectric converter 120 photoelectrically transforms the fraction of the modulated optical signal it has received and thereafter sends the converted signal to a filter unit 130 via an electrical path 135, wherein the filter unit 130 functions to remove signal noise. The filter unit 130 may comprise a band pass, low pass, or high pass filter, among others. Afterwards, a modulus converter 140 processes the signal as received from the filter unit 130 (via an electrical path 145) and subsequently sends the signal to the FFT transform unit 150 (via an electrical path 155) for FFT processing. The FFT transform unit 150 receives inputs (via an electrical path 165) and is controlled by a control unit 160, wherein the control unit 160 functions to select and output the proper FFT transform results for the optical channel identifier frequencies. The control unit 160 also serves to compare the FFT results of a plurality of windows that have been used to partition the optical identification signal and selects the windows with clean FFT spectrums to output. Alternatively, once the first window with a clean spectrum is found, the control unit 160 may use mathematic methods to determine the remainder of the windows of the plurality of windows that do not comprise a switching point by using a time delay or counting method. Thus, an FFT transform can be performed on those remaining windows determined to not have a frequency switching point. This avoids the problem of spectrum interference caused by frequency switching.

It can be seen from the above analysis that when the time window $T_W$ of each of the plurality of windows is equal to or less than $T_{MIN}/2N$ (for the case of equal frequency intervals, $T_{MIN}=T_1$), it is ensured that there is at least one window that does not contain a frequency switching point at the time optical identification of each frequency is being carried out. The shorter the time window $T_W$ of the window, the more windows containing no switching point. However, with the sampling frequency unchanged, reducing the time window $T_W$ will cause the number of sampling points to decrease, leading to a lowered frequency resolution. Therefore, the time window $T_W$ of each window should be as large as possible. As the simultaneous sampling frequency (which is in a range from about tens of KHz to about several hundred KHz) is much higher than the switching frequency of the plurality of windows, the spectrum resolution will not be lowered too much under normal conditions, and therefore will not affect the identifier frequency detection result or the identification of optical channels.

The relationship between the time window $T_W$, the sampling frequency and the identifier frequency value can be further described. Specifically, to achieve calculated FFT results which contain frequency values that are the same as the identifier frequency value, any identifier frequency value divided by $1/T_W$ must be a nonzero integer, wherein $1/T_W$ is the spectrum resolution. To assure each frequency of the identifier frequencies can be found correctly in the FFT results, the spectrum resolution should be less than or equal to the minimum difference of the frequency values of the identifier frequency. Also, since discrete values in the time domain are used to achieve the FFT results, the spectrum resolution may be an integer number of times of the sampling frequency.

Figure 8:
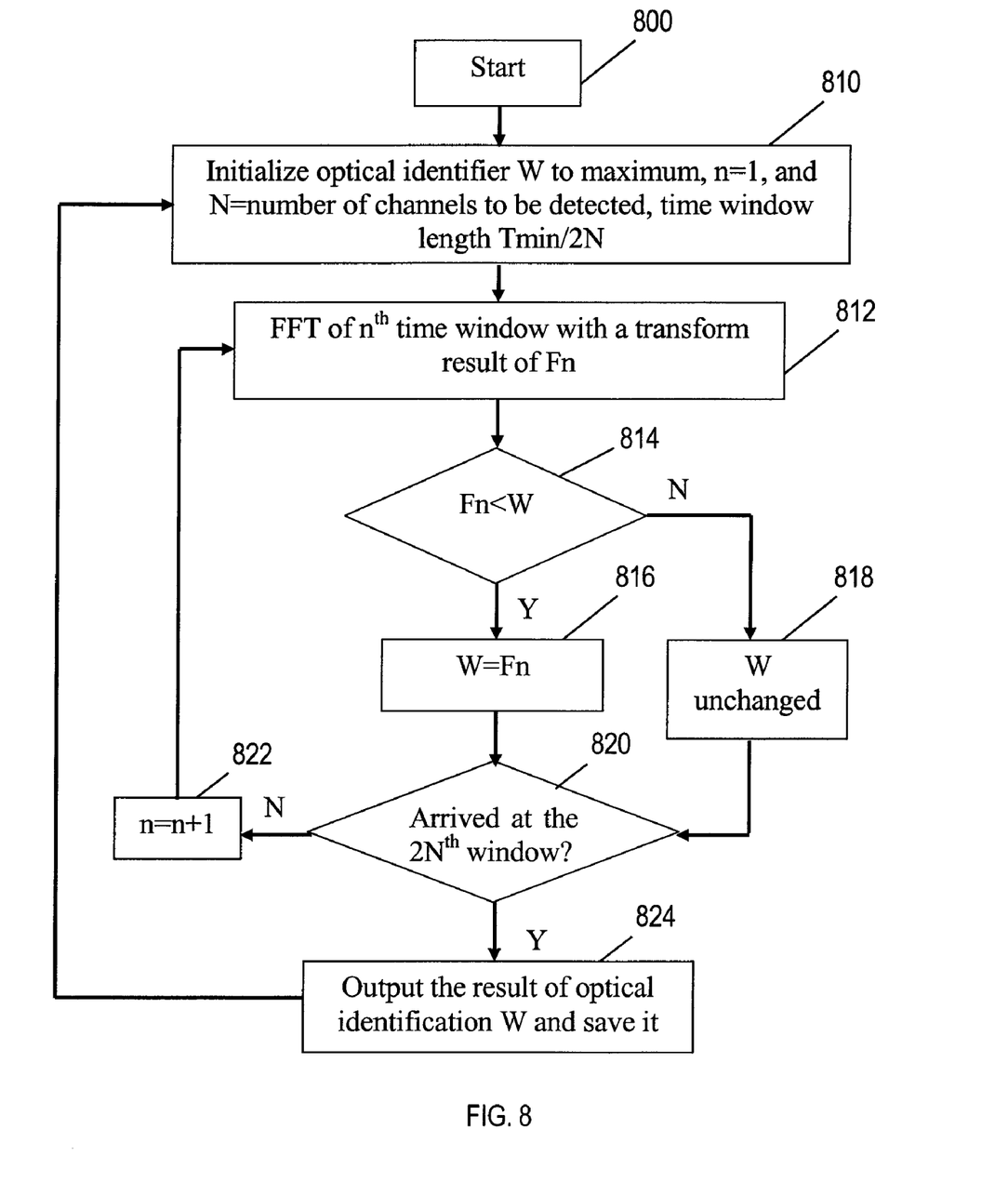
FIG. 8 is a first method in accordance with embodiments of the invention.

FIG. 8 illustrates a flow diagram of a method in accordance with embodiments of the invention. In particular, FIG. 8 shows an exemplary method for finding clean FFT results and using only those clean FFT results as the output result of the optical channel identification. The method starts (block 800) and moves to initialization of an optical identifier W, n, N, and the time window $T_W$ (block 810), wherein n is initially set to one (1) (and comprises the set of positive integers 1, 2, 3, . . . ), N is set to the number of optical channels to be detected, the time window $T_W$ corresponds to the plurality of windows used to partition the optical identification signal and is initially set to, for example, a value of that is less than or equal to $T_{MIN}/2N$, and the optical identifier W is set to a large value having a magnitude that is larger than the largest expected magnitude of the FFT spectrum of any of the identifier frequencies modulating the optical channel. The optical identifier W is initially set larger than any expected FFT value at a given frequency to account for possible sidebands, spurious peaks, or other noise. After initialization of these parameters, the method proceeds to performing an FFT of the $n^{th}$ window (beginning with the first window since n initially equals 1), whose transform result is denoted as Fn (block 812). The FFT result Fn is subsequently compared to the optical identifier W (block 814). If Fn is less than W (meaning that the current window is cleaner than the value of W which takes noise, and other factors into account), the value of W is set to the value of Fn (block 816). Afterwards, the method proceeds to determine if the current window being processed is the $2N^{th}$ window (block 820). If not, the value of n is incremented by one (1) (block 822), and the FFT of the next window in sequence is performed (block 812). Returning to the comparison of Fn and W (block 814), if the value of Fn is not less than W (meaning that the current window is not cleaner than the value of W; which may be the result of additional or unexpected noise, etc.), the value of W remains unchanged (block 818), and the method proceeds directly to determining if the current window being processed is the $2N^{th}$ window (block 820). If the window being processed is the $2N^{th}$ window, the result of the optical identification W is output and saved (block 824), and the method returns to the initialization of values (block 810). The method as just described ensures that clean FFT results will be found and that only those clean FFT results will be used as the output results for optical channel identification.

Figure 9:
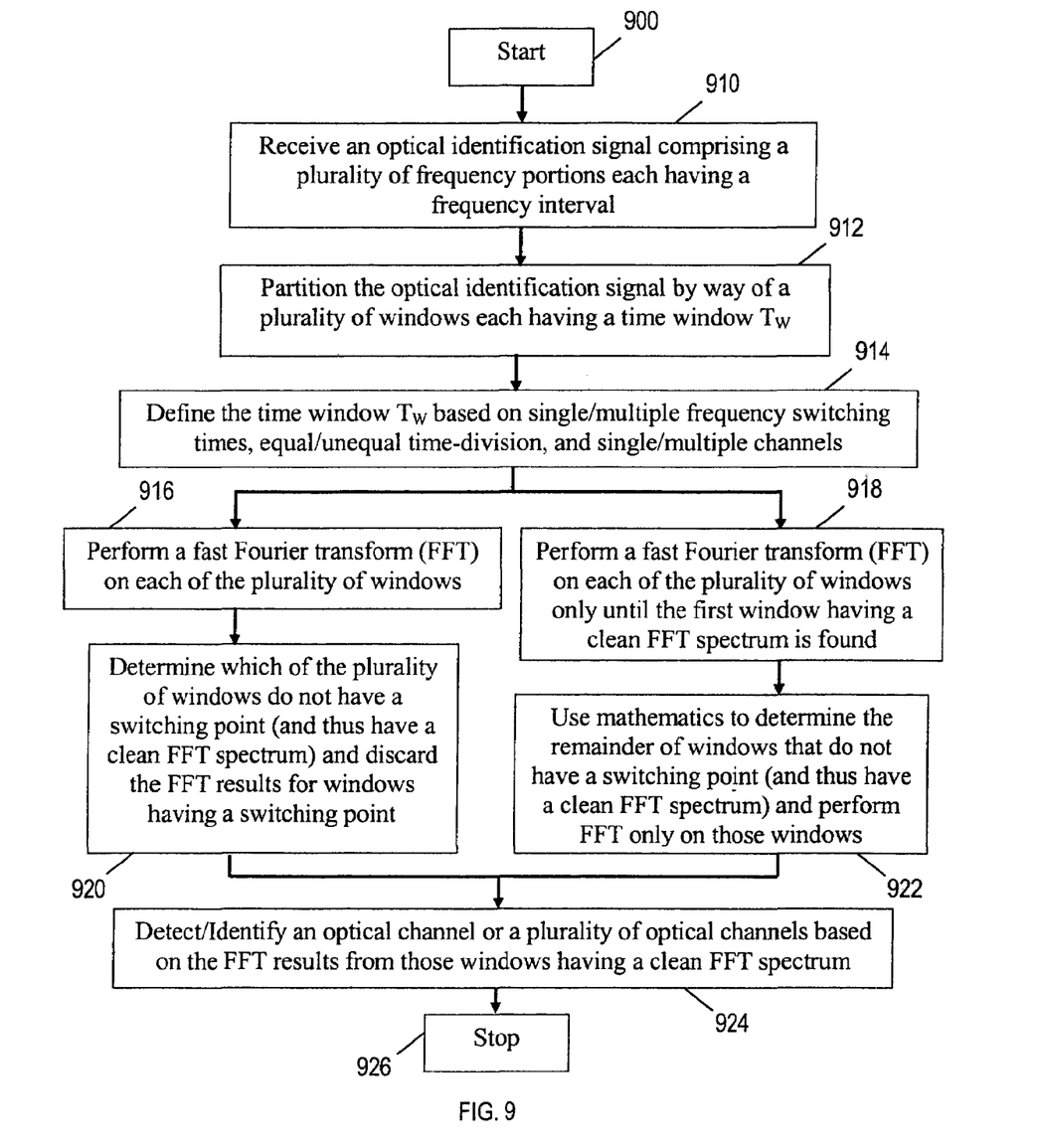
FIG. 9 is a second method in accordance with embodiments of the invention.

FIG. 9 illustrates a flow diagram of a method in accordance with alternative embodiments of the invention. In particular, FIG. 9 shows an exemplary method for demodulation of an optical identification signal or a plurality of optical identification signals. The method starts (block 900) and moves to receiving an optical identification signal which comprises a plurality (two or more) of frequency portions that each have a frequency interval (block 910). Once the optical identification signal is received, the optical identification signal is partitioned by way of a plurality of windows that each have a time window $T_W$ (block 912). The time window $T_W$ is then defined for each of the plurality of windows (block 914). As discussed above, the value of $T_W$ may depend on a number of factors such as the number of different frequency intervals, whether the time-division is equal or unequal, and whether single or multiple channels are to be detected. The method may next proceed along one of two paths. In a first case, the method may proceed to performing an FFT on each of the plurality of windows (block 916). Thus, the method would continue to determining which of the FFT data to keep by determining which of the plurality of windows do not have a switching point (block 920). Those windows not having a switching point can be distinguished based on their clean FFT spectrum. The FFT results for the windows not having a switching point are then kept, and the rest may be discarded. In a second case, the method may proceed to performing an FFT on each of the plurality of windows only until the first window having a clean FFT spectrum is found (block 918). Then, mathematic methods may be used to determine the remainder of the windows that do not have a switching point and an FFT may thus be selectively performed on each of those windows (block 922). Regardless of which of the two paths (as described above) is followed, the method next proceeds to the detection of an optical channel or a plurality of optical channels based on the FFT results from those windows having a clean FFT spectrum (block 924), and the method ends (block 926).

Figure 10:
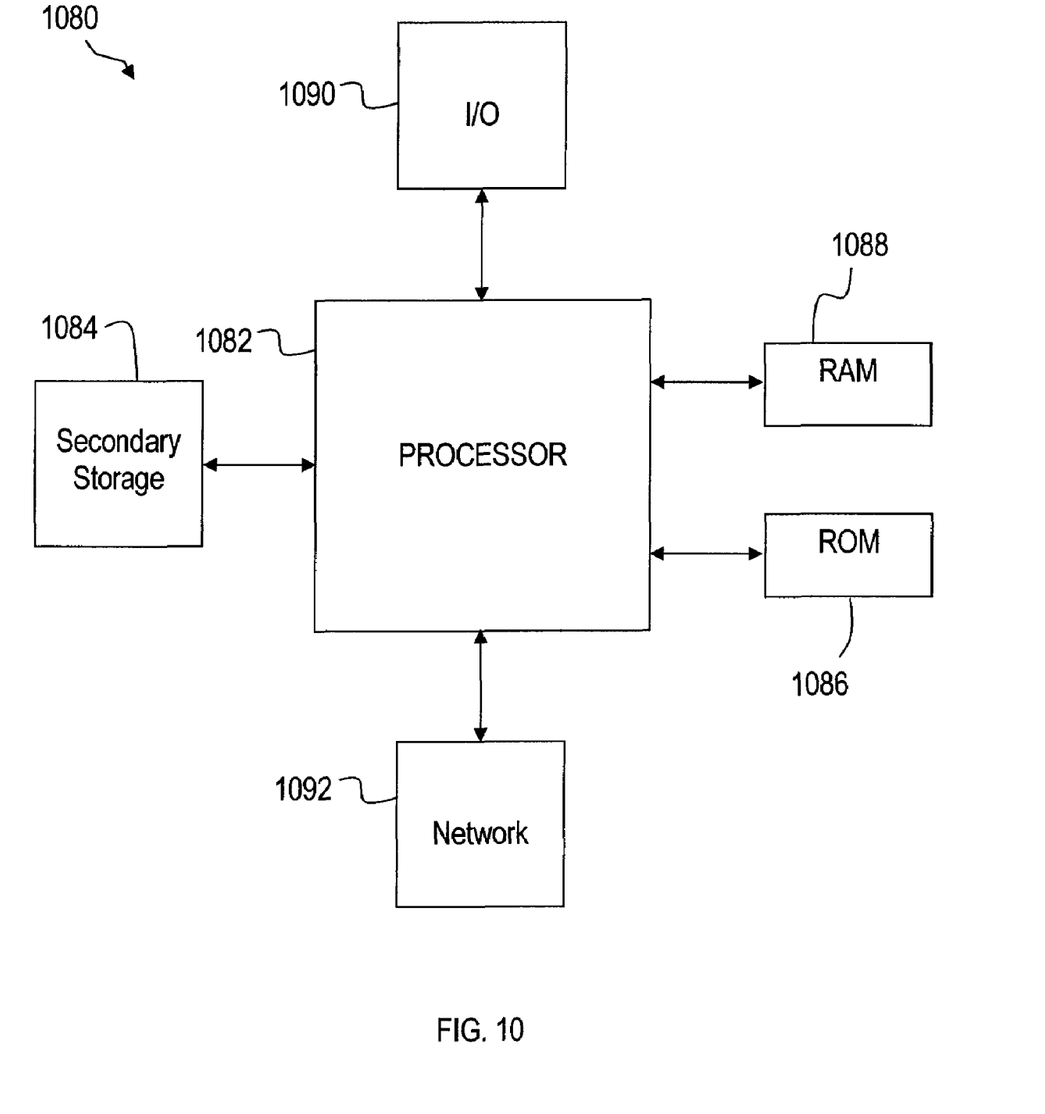
FIG. 10 illustrates an exemplary general purpose computer system suitable for implementing the several embodiments of the disclosure.

The methods and systems for demodulation of an optical identification signal as described above may be implemented in whole or in part on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 1080 includes a processor 1082 (which may be referred to as a central processor unit or CPU) that is in communication with memory devices including secondary storage 1084, read only memory (ROM) 1086, random access memory (RAM) 1088, input/output (I/O) devices 1090, and network connectivity devices 1092. The processor 1082 may be implemented as one or more CPU chips.

The secondary storage 1084 is typically comprised of one or more disk drives or tape drives and is used for non-volatile storage of data and as an over-flow data storage device if RAM 1088 is not large enough to hold all working data. Secondary storage 1084 may be used to store programs which are loaded into RAM 1088 when such programs are selected for execution. The ROM 1086 is used to store instructions and perhaps data which are read during program execution. ROM 1086 is a non-volatile memory device which typically has a small memory capacity relative to the larger memory capacity of secondary storage 1084. The RAM 1088 is used to store volatile data and perhaps to store instructions. Access to both ROM 1086 and RAM 1088 is typically faster than to secondary storage 1084.

I/O devices 1090 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1092 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as CDMA and/or GSM radio transceiver cards, and other well-known network devices. These network connectivity 1092 devices may enable the processor 1082 to communicate with an Internet or one or more intranets. With such a network connection, it is contemplated that the processor 1082 might receive information from the network, or might output information to the network in the course of performing the above-described method steps. Such information, which is often represented as a sequence of instructions to be executed using processor 1082, may be received from and outputted to the network, for example, in the form of a computer data signal embodied in a carrier wave.

Such information, which may include data or instructions to be executed using processor 1082, may be received from and outputted to the network, for example, in the form of a computer data baseband signal or signal embodied in a carrier wave. The baseband signal or signal embodied in the carrier wave generated by the network connectivity devices 1092 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1082 executes instructions, codes, computer programs, scripts which it accesses from hard disk, floppy disk, optical disk (these various disk-based systems may all be considered secondary storage 1084), ROM 1086, RAM 1088, or the network connectivity devices 1092.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A telecommunications network component comprising a processor configured to implement a method comprising:
   receiving an optical signal comprising at least one identification signal, the at least one identification signal comprising a series of frequency portions that alternate according to a determined frequency interval;
   partitioning the at least one identification signal by way of a plurality of windows;
   performing a Fast Fourier Transform (FFT) on each of the plurality of windows;
   determining which of the plurality of windows comprise a relative minimum number of frequency components; and
   detecting an optical channel based on results of the FFT performed on each of the plurality of windows that comprise the relative minimum number of frequency components.

2. The telecommunications network component according to claim 1 wherein each of the series of frequency portions has a frequency interval, wherein the frequency interval of each of the series of frequency portions is equal or unequal, wherein an optical channel is detected, and wherein a time window is less than or equal to about half of the smallest frequency interval among each of the series of frequency portions.

3. The telecommunications network component according to claim 1 wherein each of the series of frequency portions has a frequency interval, wherein the frequency interval of each of the series of frequency portions is equal or unequal, wherein a plurality of optical channels are detected, and wherein a time window is less than or equal to about half of the smallest frequency interval among each of the series of frequency portions divided by the number of optical channels being detected.

4. The telecommunications network component according to claim 1 further comprising tapping a portion of the optical signal, wherein the at least one identification signal is detected from the portion of the tapped optical signal.

5. The telecommunications network component according to claim 1 further comprising: examining the results of the FFT performed on each of the plurality of windows; and determining the windows that comprise the relative minimum number of frequency components.

6. The telecommunications network component according to claim 1 further comprising finding a first window comprising a relative minimum number of frequency components and thereafter determining the remainder of the windows that comprise the relative minimum number of frequency components.

7. An apparatus comprising:
   a photoelectric converter configured to receive an optical signal comprising a plurality of identification signals and convert the optical signal into an electrical signal comprising the identification signals; and
   a processor configured to receive the electrical signal and implement a method of selecting a time window for each of a plurality of windows, the method comprising:
   designating a base time for each of the identification signals based on a minimum frequency interval;
   selecting a minimum base time from a plurality of base times; and
   setting the time window less than or equal to half of the minimum base time divided by a number of optical channels being detected.

8. The apparatus according to claim 7 wherein the method further comprises choosing the time window based on a relationship between the time window, a sampling frequency, and a plurality of identifier frequencies.

9. The apparatus according to claim 8 wherein the setting further comprises setting a spectrum resolution less than or equal to the smallest difference of frequency values of the identifier frequency, and wherein the time window is selected to make a plurality of calculated FFT results contain frequency points that are the same as frequency values of the identifier frequency.

10. A method of finding a clean time window from a plurality of windows comprising:
   receiving an optical identification signal at a photoelectric converter, wherein the optical identification signal is used to detect an optical channel, wherein the optical identification signal comprises a first frequency portion having a first frequency interval and a second frequency portion having a second frequency interval, wherein the first frequency portion and the second frequency portion alternate in sequence based on the first frequency interval and the second frequency interval, and wherein a plurality of frequency switching points are located where the optical identification signal changes between the first frequency portion and the second frequency portion;
   partitioning the optical identification signal using the plurality of windows using a modulus converter;
   performing a Fast Fourier Transform (FFT) on each of the plurality of windows using a FFT unit, wherein the plurality of windows comprise a set of windows having a relative minimum number of frequency components; and
   using results of the FFT performed on the set of windows having the relative minimum number of frequency components for detection of the optical channel.

11. The method according to claim 10 wherein the length of the time window used for FFT is less than or equal to about half of the smallest frequency interval when an identifier is received.

12. The method according to claim 10 wherein the length of the time window used for FFT is less than or equal to about half of the smallest frequency interval among each of the series of frequency portions divided by the number of optical channels being detected when a plurality of identifiers are received.

13. The method according to claim 10 further comprising examining the results of the FFT performed on each of the plurality of windows and determining the windows that comprise the relative minimum number of frequency components.

14. The method according to claim 10 further comprising finding a first window comprising a relative minimum number of frequency components and thereafter determining the remainder of the windows that comprise the relative minimum number of frequency components.

15. A system comprising:
   an optical tap that extracts a portion of a modulated light source comprising an optical identification signal, wherein the optical identification signal comprises a series of frequency portions that alternate according to a frequency interval, and wherein the optical identification signal identifies an optical channel;

a modulus converter electrically coupled to the optical tap that partitions the optical identification signal by way of a plurality of windows;

a Fast Fourier Transform (FFT) unit electrically coupled to the modulus converter that performs an FFT on each of the plurality of windows; and a control unit electrically coupled to the FFT unit, wherein the control unit determines which of the plurality of windows comprise a relative minimum number of frequency components, and wherein the control unit identifies the optical channel based on results of the FFT performed on each of the plurality of windows that comprise the relative minimum number of frequency components.

16. The system according to claim 15 wherein the control unit identifies a first window comprising the relative minimum number of frequency components, and thereafter determines the remainder of the windows that comprise the relative minimum number of frequency components.

17. The system according to claim 15 wherein the frequency interval of each of the series of frequency portions are equal, wherein each of the plurality of windows has a time window, and wherein the time window is less than or equal to about half the frequency interval.

18. The system according to claim 17 wherein the optical identification signal further identifies a plurality of optical channels, and wherein the time window is further divided by the number of optical channels being identified.

19. The system according to claim 15 wherein the frequency interval of each of the series of frequency portions are unequal, wherein each of the plurality of windows has a time window, and wherein the time window is less than or equal to about half of the smallest frequency interval among each of the series of frequency portions.

20. The system according to claim 19 wherein the optical identification signal further identifies a plurality of optical channels, and wherein the time window is further divided by the number of optical channels being identified.

* * * * *

UNITED STATES PATENT AND TRADEMARK OFFICE
CERTIFICATE OF CORRECTION

PATENT NO. : 7,603,034 B2
APPLICATION NO. : 11/537964
DATED : October 13, 2009
INVENTOR(S) : Shen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Fifth Day of October, 2010

David J. Kappos
*Director of the United States Patent and Trademark Office*